United States Patent [19]
Baker et al.

[11] Patent Number: 5,610,458
[45] Date of Patent: Mar. 11, 1997

[54] ELECTRICAL CONNECTION OF PRINTED CIRCUIT BOARD TO LINE LEADS ON BRUSHLESS PERMANENT MAGNET REFRIGERATION MOTORS

[75] Inventors: Gerald N. Baker, Florissant; Arthur E. Woodward, St. Louis County, both of Mo.

[73] Assignee: Emerson Electric Co., St. Louis, Mo.

[21] Appl. No.: 240,629

[22] Filed: May 11, 1994

[51] Int. Cl.$^6$ .............................. H02K 11/00; H02K 5/00
[52] U.S. Cl. .............................. 310/68 R; 310/71; 310/91
[58] Field of Search ............................... 310/68 R, 67 R, 310/71, 89, 91; 361/760, 772–775, 777–778, 790–791, 803, 805, 807, 809, 811, 944

[56] References Cited

U.S. PATENT DOCUMENTS

| | | | |
|---|---|---|---|
| 2,801,354 | 5/1957 | Donahoo | 310/71 |
| 2,898,518 | 8/1959 | Lynn | 361/760 |
| 2,913,634 | 11/1959 | Scoville | 361/743 |
| 3,010,052 | 11/1961 | Heath et al. | 361/744 |
| 3,506,879 | 4/1970 | Maxwell et al. | 361/774 |
| 3,982,811 | 9/1976 | Siu et al. | 361/774 |
| 4,791,329 | 12/1988 | Ubukata et al. | 310/68 |
| 4,866,317 | 9/1989 | Katayama | 310/89 |

*Primary Examiner*—Clayton E. LaBalle
*Attorney, Agent, or Firm*—Polster, Lieder, Woodruff & Lucchesi

[57] ABSTRACT

A brushless permanent magnet (BPM) motor has a stator mounted on a hub projecting from a base-enclosure. The base-enclosure is cup-shaped, open at an end remote from the stator hub, having a side wall and a top wall defining an interior space. A printed circuit board (PCB) is mounted above the top wall, below the stator. Electrical conductors electrically connected to a printed circuit on the printed circuit board extend through the top wall and into the interior space. The electrical conductors are mounted in a connector of the insulation displacement type. Preferably the connector is made integral with an interior surface of the base-enclosure. It comprises an elongate boss with longitudinal slots in it to receive electrical conductors that are inserted into the slots and bent to extend transversely to a long axis of the boss, and channels extending parallel to the long axis of the boss to receive other electrical conductors, usually in the form of spade terminals or the like, which fit tightly in the channels and make solid physical and electrical contact with the transversely oriented conductors. When current is supplied directly to the only PCB, current supply conductors extend through a side wall port and are electrically connected in the connector boss to the electrical conductors from the printed circuit. When current is supplied to a second PCB, housed in the base-enclosure, conductors from the second PCB are electrically connected in the connector boss to the conductors from the PCB mounted above the top wall of the base-enclosure. Preferably the conductors from a printed circuit board are held spaced apart by one or more passive elements of the circuit.

8 Claims, 10 Drawing Sheets

ELECTRICAL CONNECTION OF PRINTED CIRCUIT BOARD TO LINE LEADS ON BRUSHLESS PERMANENT MAGNET REFRIGERATION MOTORS

RELATED APPLICATIONS

This application is related to co-pending application Ser. No. 08/237,782, filed May 4, 1994, Hoemann et al., High Efficiency Power Supply and Control for Brushless Permanent Magnet Motor; Ser. No. 08/237,780, filed May 4, 1994, Baker et al., Integral Refrigerator Motor Fan Blades; Ser. No. 08/240,633, filed May 11, 1994, Baker et al., Brushless Permanent Magnet Condenser Motor for Refrigeration; and Ser. No. 08/240,635, filed May 11, 1994, May, et al., Integral Connector and Motor Housing, all assigned to the assignee of the present invention, the disclosures of which are incorporated herein by reference.

BACKGROUND OF THE INVENTION

This invention relates to dynamoelectric machines in the form of electric motors. While the invention is described with particularity with respect to brushless permanent magnet (BPM) motors, those skilled in the art will recognize the wider applicability of the inventive principles disclosed hereinafter.

There has been, and continues to be, a movement toward high operating efficiency devices. That movement includes a move by appliance manufacturers to provide high efficiency consumer appliances for general use. Certain improvements in such appliance efficiency are more obvious than others. For example, the ubiquitous household refrigerator has at least three electric motors associated with it. They include a hermetic compressor motor which drives the compressor for the refrigerant system, an evaporator motor, and, in many refrigerators, a condenser motor. The general operation of the refrigeration system of the conventional refrigerator is well known. The compressor moves the refrigerant from the evaporator into the condenser. It then forces the refrigerant back to the evaporator through an expansion valve. Refrigerant vapor leaves a compressor at high pressure. As it flows into the condenser, the high pressure causes the vapor to condense back to liquid refrigerant. As this happens, the vapor gives out heat, making the condenser warm. The condenser is at the back of the refrigerator, and heat flows into the air around the refrigerator, often with the aid of the aforementioned condenser fan. The refrigerant leaves the expansion valve at low pressure, causing it to evaporate inside the pipe and get cold. The evaporator is inside the refrigerator and heat flows into the evaporator, making the refrigerator cold. Again, a fan is used to force air over the evaporator and distribute the cool air throughout the refrigerator interior.

Refrigerators operate day and night and because of that operation, their operation cost is relatively substantial, even when attempts are made to increase their efficiency. Recently, there has been an industry-wide effort by refrigerator OEMs (original equipment manufacturers) to raise the level of refrigerator efficiency.

As will be appreciated by those skilled in the art, brushless permanent magnet motors in operational use offer the best efficiency presently known for electric motors in general use, although switched reluctance motors (SRM) and controlled induction motors (CIM) often are configured to achieve substantially equivalent performance. In the size of the motor of this invention, the brushless permanent magnet motor was found to offer the best engineering solution. A brushless permanent magnet motor is similar to other motor types in that it includes a stator assembly having a core of laminations formed from suitable magnetic material. The core has winding receiving slots formed in it. The rotor assembly commonly is the component that distinguishes a permanent magnet motor from other motors. Unlike other conventional motor constructions, a BPM rotor has at least one permanent magnet associated with it. The motor may be either of a conventional design, in which the stator assembly has an axial opening through the core for reception of the rotor assembly, or the motor can be a so-called inside out motor, which has the rotor assembly outboard of the stator.

While brushless permanent magnet motors offer higher efficiencies, they require an electronic circuit for applying electrical energy to the motor windings for proper operation of the motor. The control circuits required for motor operation often make application of the permanent magnet motor economically unjustifiable.

Condenser and evaporator fans in refrigerators conventionally are small and low cost designs. The low cost design of these motors commonly equates with a relatively low efficiency design. I have found that the lower efficiency evaporator or condenser motors can be replaced with more efficient permanent magnet motors when the assembly and construction techniques disclosed hereinafter are employed for and in the motor design, and the motor control functions are accomplished in accordance with the various disclosures incorporated by reference.

One of the objects of this invention is to provide an economically producible permanent magnet condenser fan motor.

Another object of this invention is to provide means for facilitating internal connection of electrical conductors.

Other objects will be apparent to those skilled in the art in light of the following description and accompanying drawings.

SUMMARY OF THE INVENTION

In accordance with this invention, generally stated, in a brushless permanent magnet (BPM) motor with a stator mounted on a hub projecting from a base-enclosure that is cup-shaped, open at an end remote from the stator hub, having a side wall and a top wall defining an interior space, a printed circuit board (PCB) is mounted above the top wall, below the stator. Electrical conductors electrically connected to a printed circuit on the printed circuit board extend through the top wall and into the interior space. The electrical conductors are mounted in a connector of the insulation displacement type, one form of which is known commercially as a Magmate connector. In the preferred embodiments, such a connector is made in one piece with an interior surface of the base-enclosure. It comprises an elongate boss with longitudinal slots in it to receive electrical conductors that are inserted into the slots and bent to extend transversely to a long axis of the boss, and channels extending parallel to the long axis of the boss to receive other electrical conductors, usually in the form of spade terminals or the like, which fit tightly in the channels and make solid physical and electrical contact with the transversely oriented conductors. When current is supplied directly to the only PCB, current supply conductors extend through a side wall port and are electrically connected in the connector boss to the electrical conductors from the printed circuit. When current is supplied to a second PCB, housed in the base-enclosure, electrical conductors from the PCB above the enclosure are still brought into the interior space, and electrically connected to electrical conductors of the second PCB in the connector boss.

In either embodiment, conductors from a printed circuit board are held spaced apart in substantial parallelism a distance equal to the distance apart of the slots in the connector boss by an element of the circuit, such, for example, as a condenser, a resistor, or one or more diodes. The spaced conductors are then easily inserted in the slots of the connector boss at the same time.

DESCRIPTION OF THE PREFERRED EMBODIMENT

Figure 1:
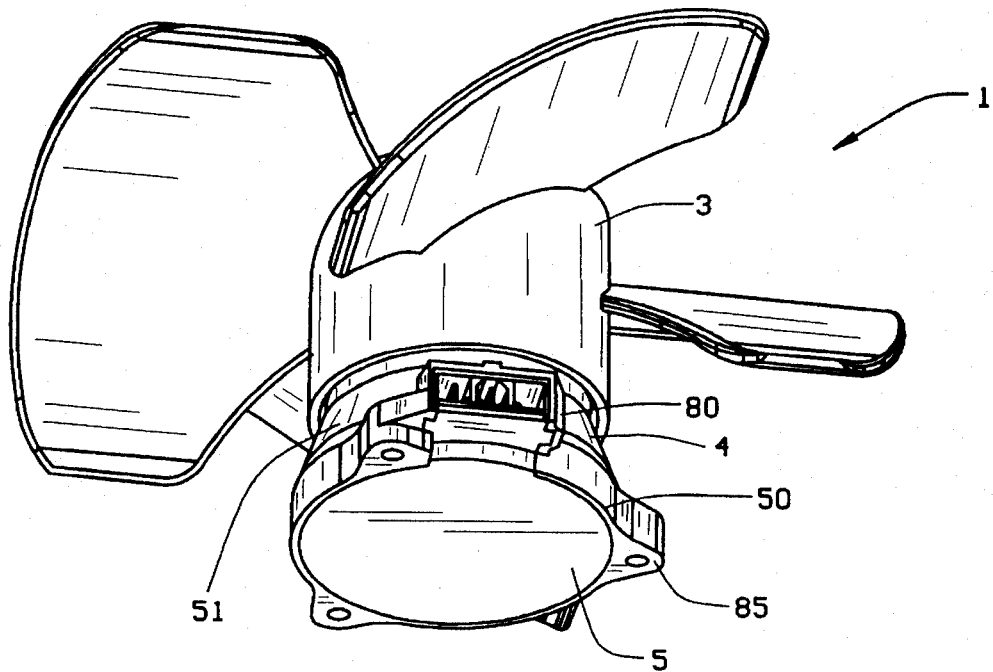
FIG. 1 is a bottom view, in perspective, of one illustrative embodiment of motor assembly, in which two circuit boards are employed.
Figure 2:
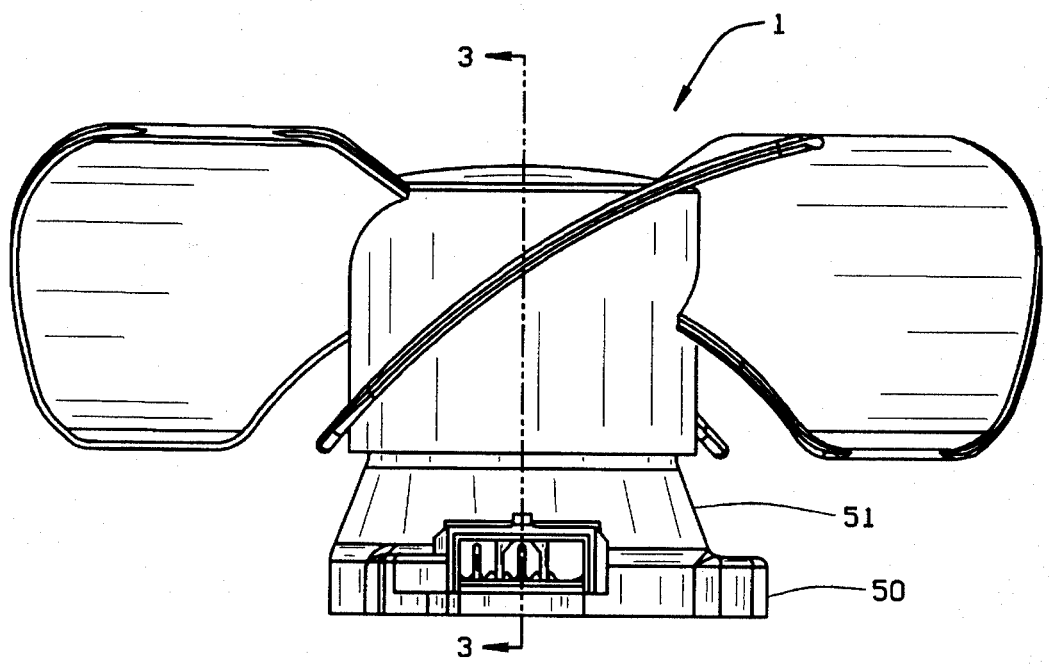
FIG. 2 is a side view thereof.

Referring now to FIG. 1, reference numeral 1 indicates a brushless permanent magnet motor employing two circuit boards. The motor 1 includes an integral fan blade assembly 3, which forms no part of the present invention, an enclosure 4, and an end cover 5. Motor assembly 1 also includes a stator assembly 7 and a rotor assembly 8, a motor connection and control assembly 9, a power supply assembly 10, component parts of which are best observed in FIGS. 3 through 8.

Figure 6:
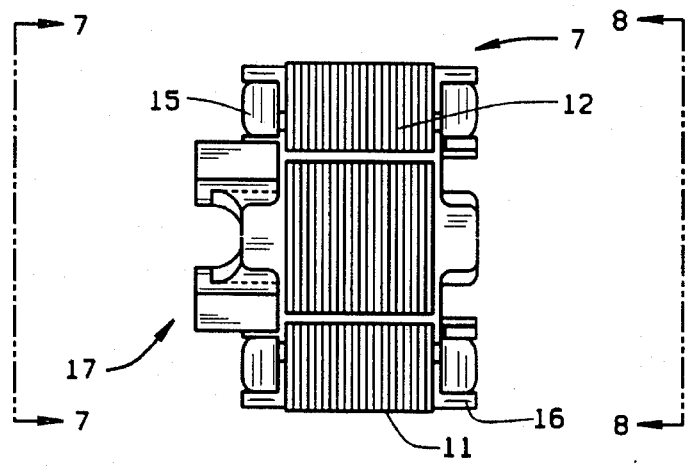
FIG. 6 is a view in side elevation of a stator assembly for the motor shown in FIG. 1.
Figure 7:
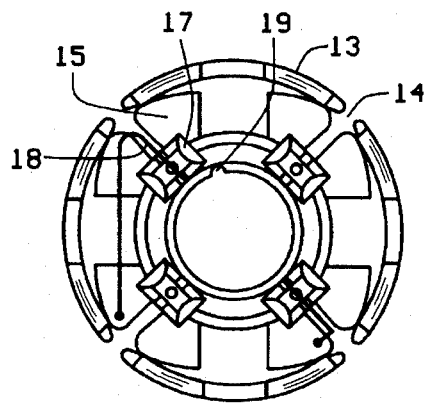
FIG. 7 is an end view taken along the line 7—7 of FIG. 6.
Figure 8:
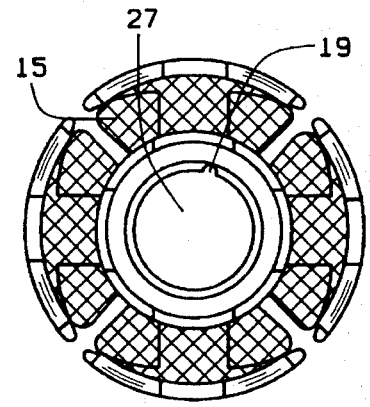
FIG. 8 is an end view taken along the line 8—8 of FIG. 6.
Figure 9:
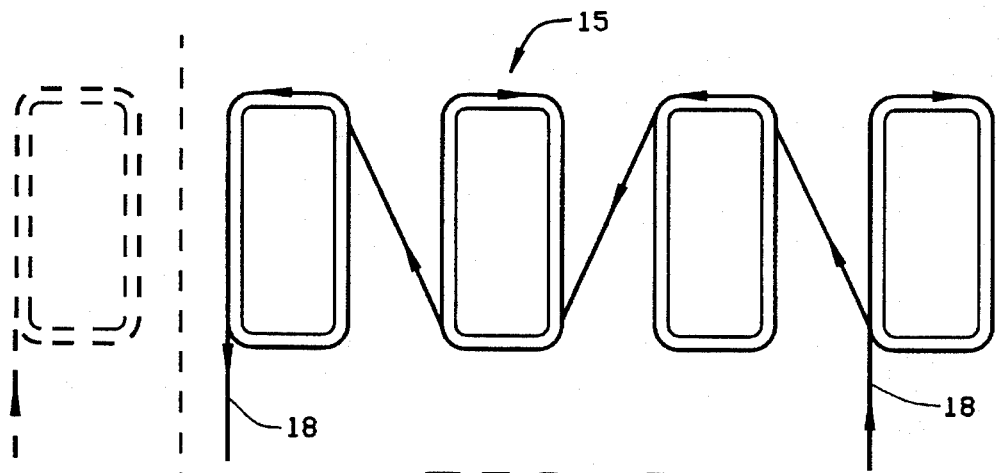
FIG. 9 is a diagrammatic view of the winding employed in conjunction with the motor of FIG. 1.
Figure 10:
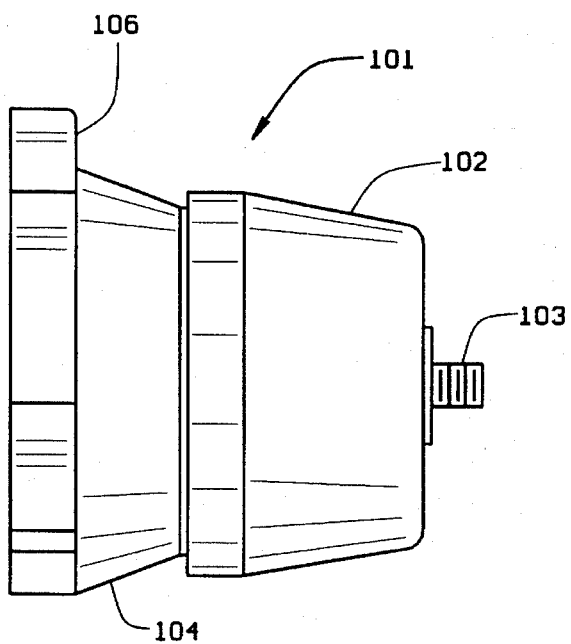
FIG. 10 is a view in side elevation of an embodiment of a BPM motor employing a single circuit board.
Figure 11:
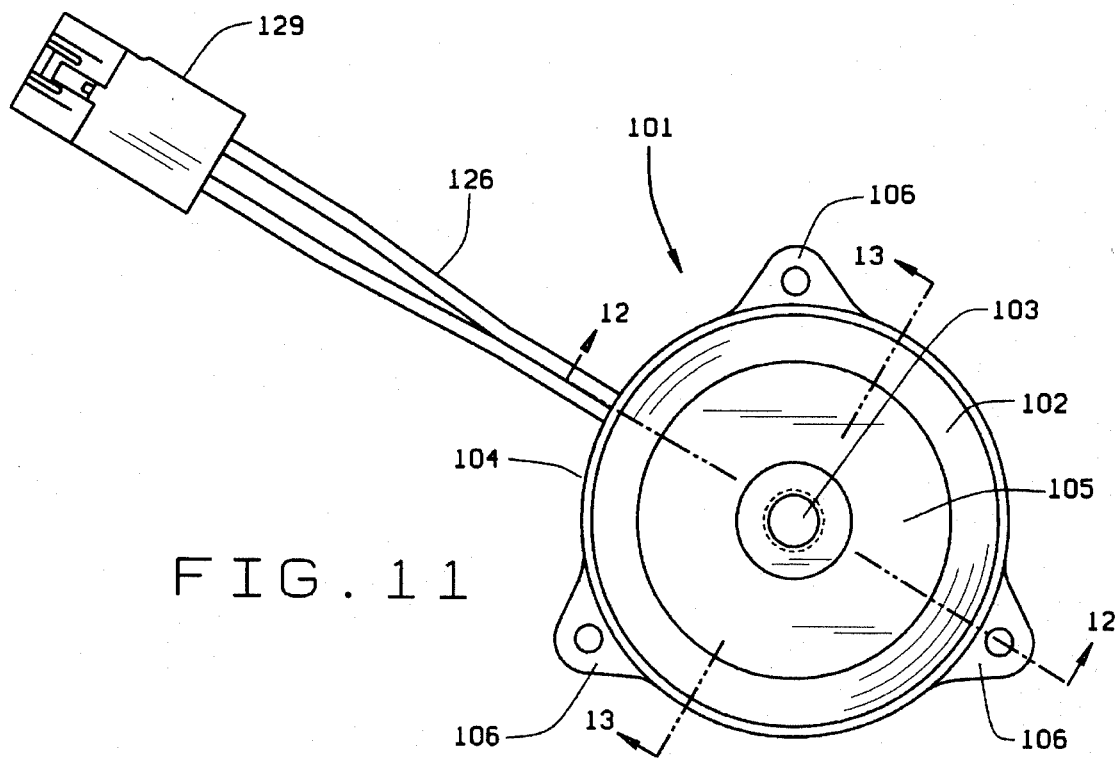
FIG. 11 is a bottom plan view of the motor shown in FIG. 10.
Figure 12:
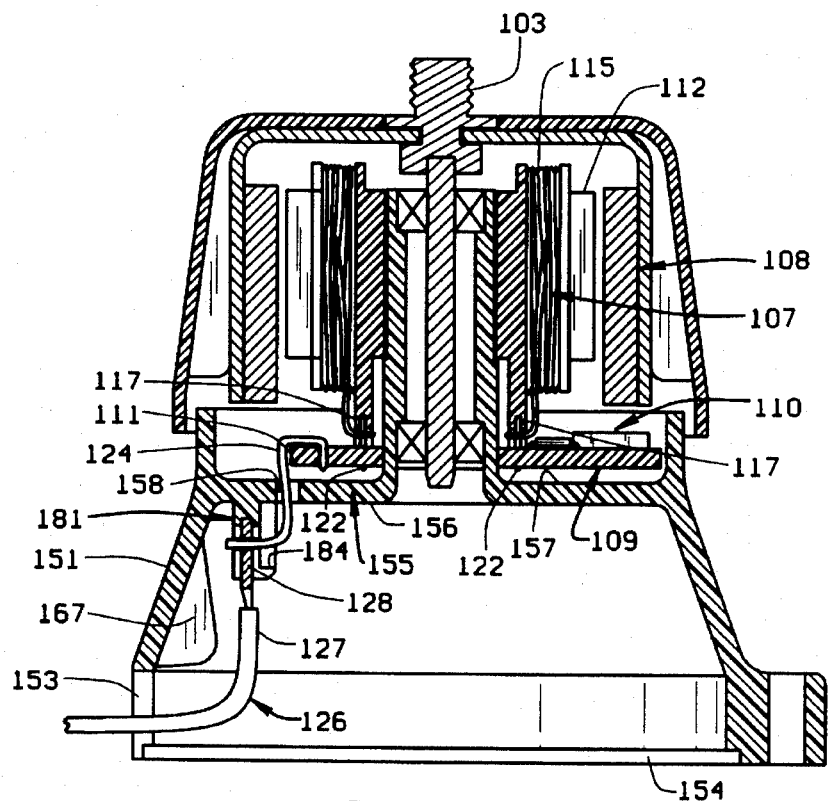
FIG. 12 is a sectional view taken along the line 12—12 of FIG. 11.
Figure 13:
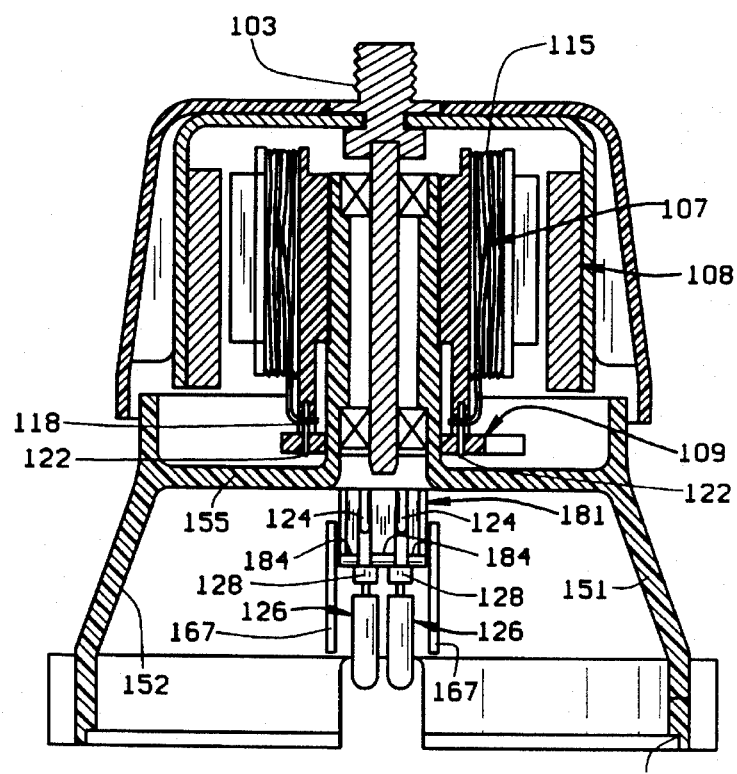
FIG. 13 is a sectional view taken along the line 13—13 of FIG. 11.
Figure 14:
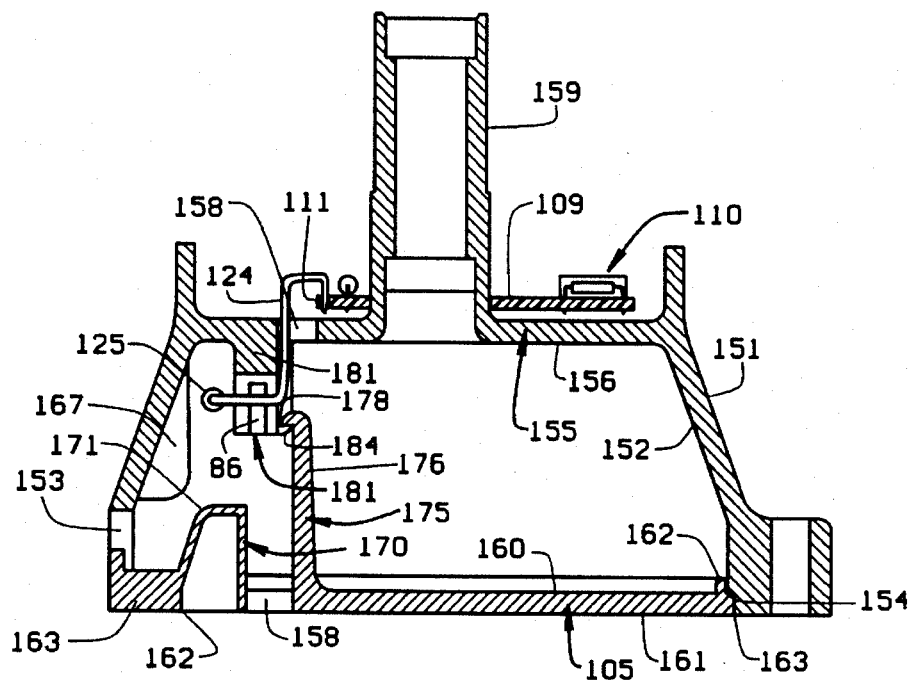
FIG. 14 is a sectional view corresponding to FIG. 12, but without a stator assembly or rotor cup, and with a base cover in place.
Figure 15:
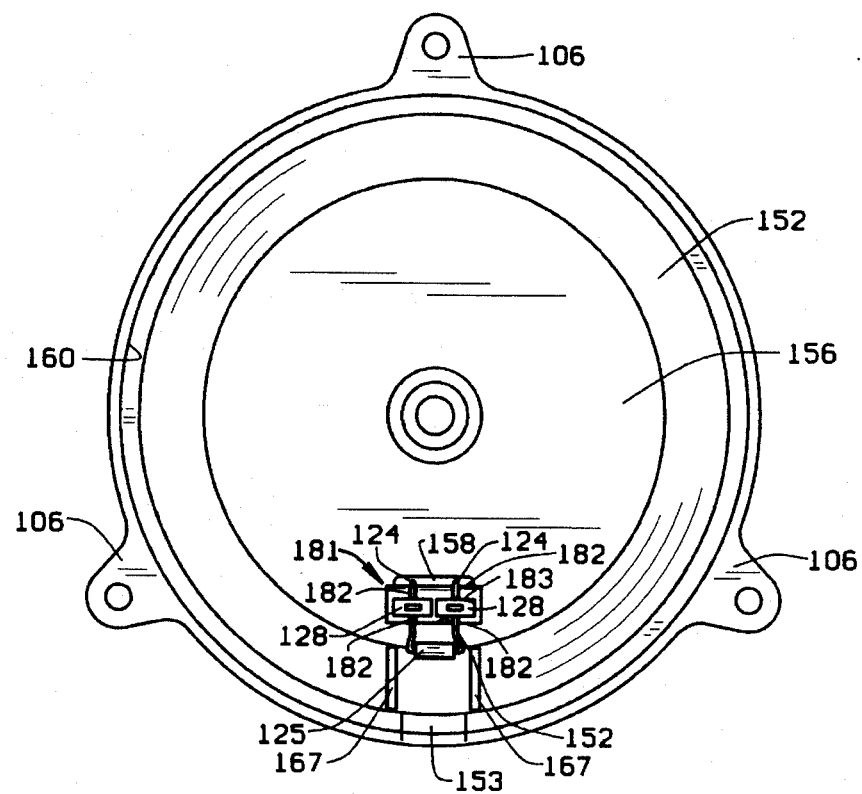
FIG. 15 is a bottom plan view of an enclosure of the motor of FIGS. 10-14, without a cover.
Figure 16:
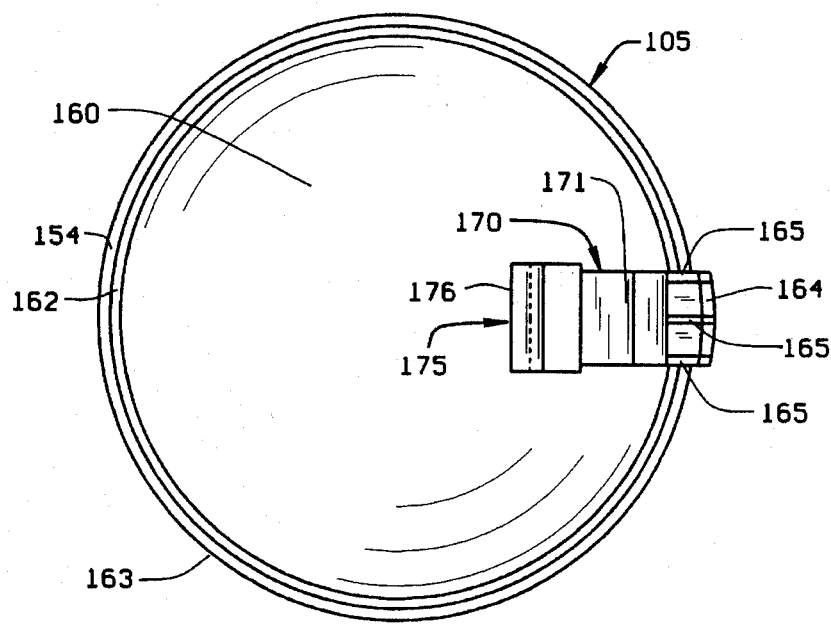
FIG. 16 is a top plan view of a base cover.
Figure 17:
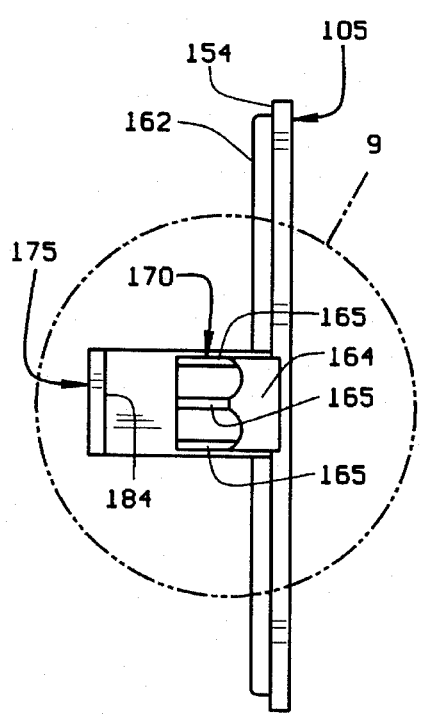
FIG. 17 is an enlarged detail view in front elevation of FIG. 16.
Figure 18:
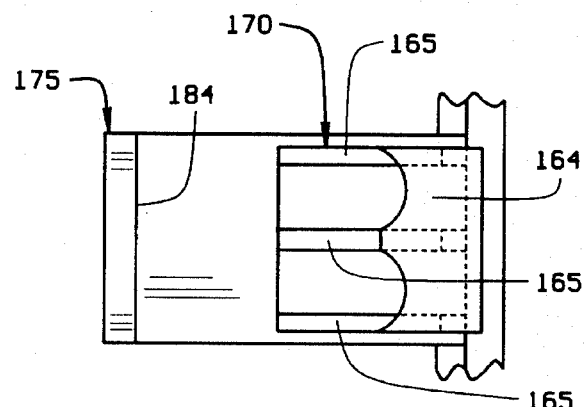
FIG. 18 is an enlarged fragmentary view of the parts enclosed within the circle 18 of FIG. 17.
Figure 26:
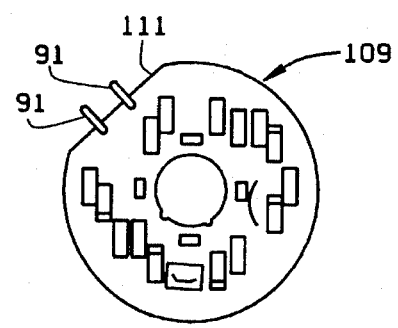
FIG. 26 is a top plan view of a printed circuit board used in the illustrative embodiment of motor described.
Figure 19:
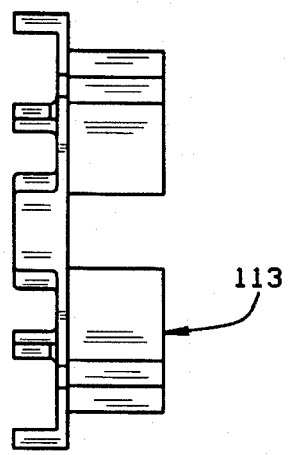
FIG. 19 is a view in side elevation of the upper of two molded insulators inserted into slots in the stator core.
Figure 20:
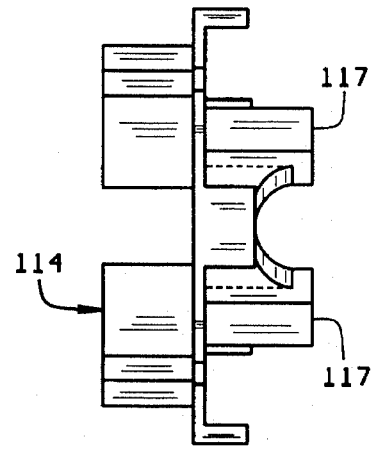
FIG. 20 is a view in side elevation of the lower of two molded insulators, provided with slotted wire-receiving legs.
Figure 21:
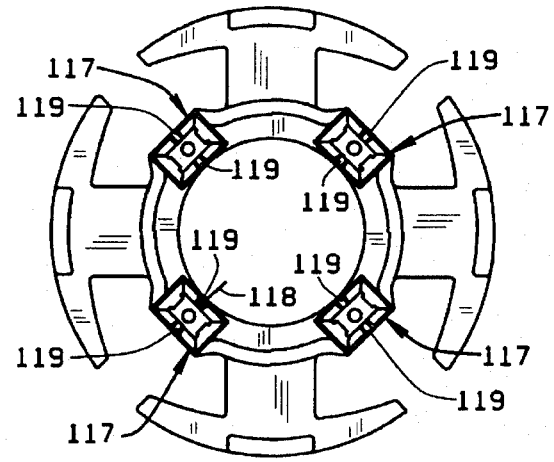
FIG. 21 is a bottom plan view of the insulator of FIG. 20.
Figure 22:
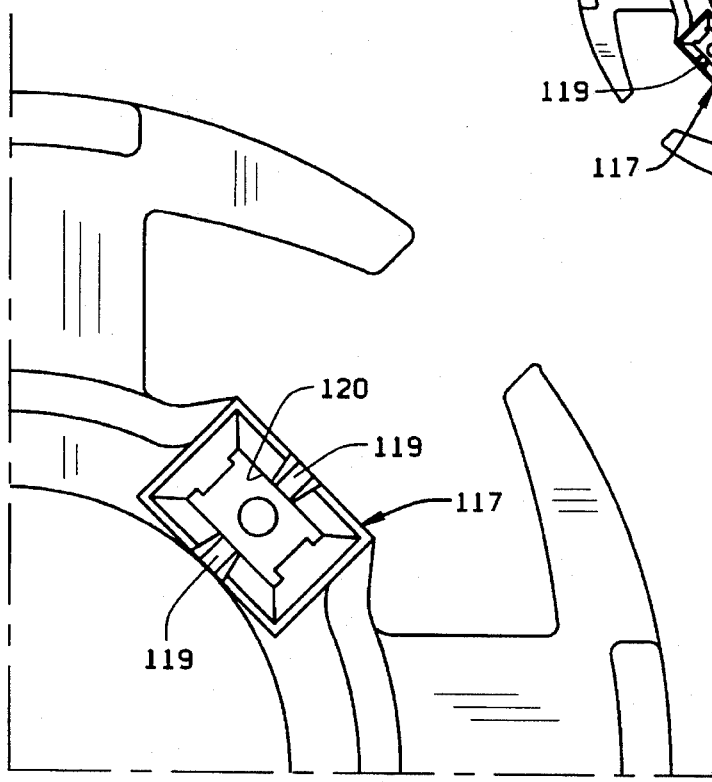
FIG. 22 is a fragmentary enlarged detail view of one segment of FIG. 21.
Figure 23:
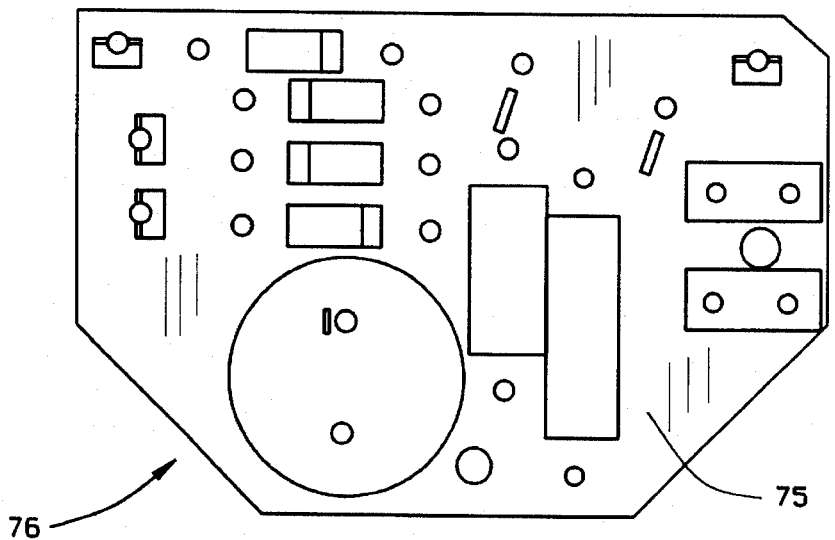
FIG. 23 is a top plan view of a motor control assembly circuit board.
Figure 24:
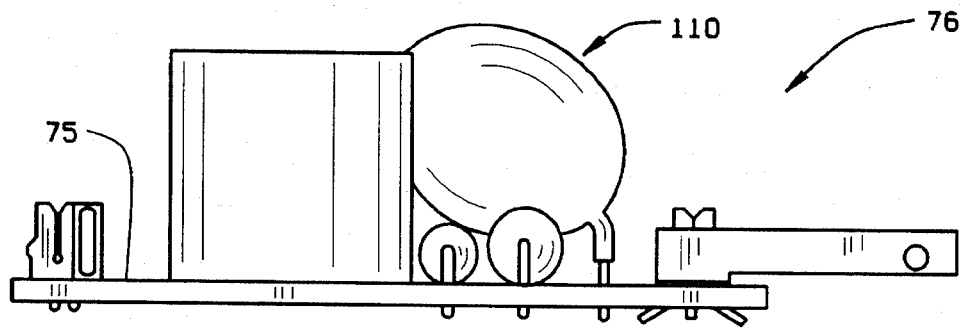
FIG. 24 is a view in side elevation of the circuit board of FIG. 23.
Figure 25:
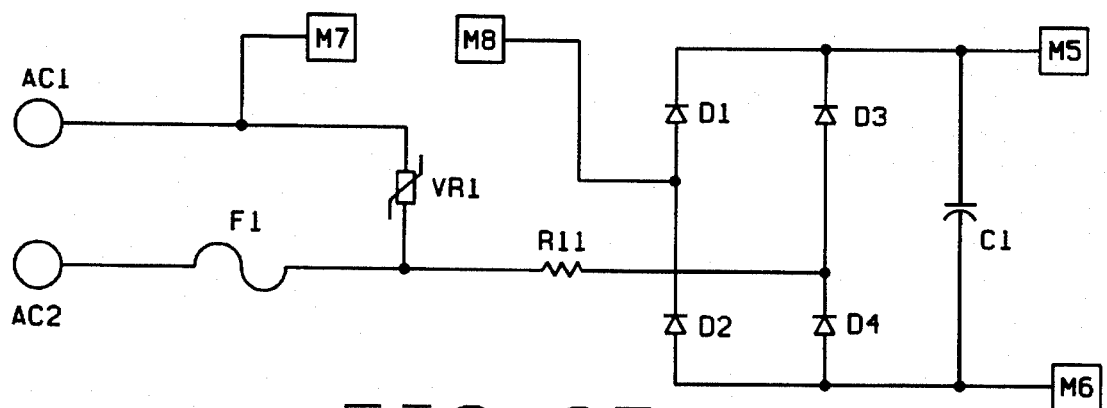
FIG. 25 is a circuit diagram of one embodiment of motor of this invention.

As shown in FIG. 6, the stator assembly 7 includes a core 12 constructed from a plurality of individual laminations formed of suitable magnetic material. For ease of illustration, the core 12 is illustrated in solid form in FIG. 5. Those skilled in art will recognize that the core assembly may have a plurality of shapes or forms. The core 12, as indicated, is formed from a plurality of stator laminations 11. The laminations 11 are constructed by any conventional method. For example, the laminations 11 may be punched individually and assembled in the core, or the laminations may be constructed in a continuous strip as described, for example, in U.S. Pat. No. 4,613,780, a manufacturing process long used for alternator cores. In any event, the laminations have a location notch 19 formed in them, and define a central opening 27 in their core 12 assembled relationship.

The laminations 11 define a plurality of physical poles 13, separated by a winding receiving slot 14. A winding 15 is positioned or wound over the individual poles 13 in a conventional manner. Prior to such placement, however, molded core insulation 16 is placed on the core 12. Insulation 16 may be constructed in any convenient way. For example, the insulation 16 may be formed by molding it in situ on the core, so that the winding 15 may be placed in insulative relationship to the core 12. In the embodiment illustrated, the insulation 16 is formed separately and merely inserted into the core in a friction fit. The stator assembly 7 of the present invention is unique in that suitable winding termination means 17 is formed on at least one of the respective ends of the insulation 16 for purposes generally described hereinafter, and specifically described in co-pending application, Ser. No. 08/240,633, filed May 11, 1994, the disclosure of which is incorporated by reference. It is here noted that at least one end 18 of a particular phase of the winding 15 is engaged in and by the termination means 17. The winding 15 is shown in cross hatch in FIG. 8 merely for illustrative purposes. Each of the termination means 17 is in the form of a leg with a slit in it with a closed end adjacent the stator. A lead end 18 of the winding 15 is pulled through the slit to lie transversely of the leg. The leg also has a connector-receiving channel in it, parallel to the slit, to receive an electrical conductor, usually in the form of a spade terminal and to provide intimate physical and electrical contact between the end of the terminal and an end 18 of the winding.

Rotor assembly 8 includes a cup 20 having a top wall 21 and an annular side wall 22. The top wall 21 has a central opening 23 formed in it, sized to receive a shaft 24. Shaft 24 is attached to cup 20 by any convenient method. In the motor illustrated in FIGS. 1–9, the shaft 24 is permanently attached to the cup 20 along the top wall 21 by casting a suitable material about the shaft and cup 20, as illustrated at 25. Casting is accomplished in a mold, not shown, which holds the proper relationship between the shaft and cup until the material sets and thereafter maintains the relationship. Preferably, the material is zinc, although other materials may be employed, if desired.

At least one permanent magnet 26 is formed to fit along the side wall 22 of the cup 20. Magnet 26 is attached to side wall 22 by any convenient method. Suitable epoxy adhesive works well, for example. The number, placement, and design of magnet 26 depend in large measure on the electrical property design requirements that the motor assembly 1 is intended to accomplish. Details of the control features and the circuit required for that control are described in the aforementioned application, Ser. No. 08/237,782, the disclosure of which is incorporated herein by reference.

Fan blade assembly 3 includes a central hub 30 having a plurality of fan blades 31 extending outwardly from it. Preferably, the blades 31 are integrally formed with hub 30. Hub 30 includes a top 32 and a side wall 33 which, together, define a chamber 34. Side wall 33 has an exterior surface 35 and an interior surface 36, separated by a material thickness 40 of the side wall. Material thickness 40 may vary in other embodiments of the invention in order to provide suitable construction characteristics as may be required for blade assembly 3 applicational use. A plurality of spacers 37 are formed along the surface 36 of the side wall 33. Spacers 37 mate with the side wall 22 of cup 20 and position the cup and the blade assembly 3 with respect to one another. Preferably, the spacers 37 include radially inwardly directed projections 38. The projections 38 are designed to engage a lower edge 28 of the cup 20 during the assembly process described hereinafter. As will be appreciated by those skilled in the art, spacers 37 may vary or be eliminated, so as to vary the diameter of the chamber 34, permitting that chamber to accept various sizes of the cup 20. That ease in variation enables the motor designer to utilize the same forming molds for the blade assembly 3 in a variety of motor sizes and applications, without requiring additional tooling in each instance. As will be appreciated, the projection 38 may extend from the surface 36, if desired.

Because fan assembly 3 is a molded part, it also is relatively easy to vary the design of the blades 31, again to fit the application requirement. This is an important feature of the invention claimed in Ser. No. 08/237,780, in that a designer can alter blade pitch and blade silhouette easily without requiring completely new molds for fan blade construction.

The side wall 33 has a lip 39 formed in it along the material thickness 40 of the side wall. The lip 39 forms a portion of a labyrinth seal system 100, described hereinafter.

Enclosure 4 includes a base member 50 having a side wall 51 extending axially outwardly from it. The side wall 51 defines a cylindrical upper portion 52. The portion 52 extends upwardly from a top wall or plate 53. Plate 53 is formed integrally with enclosure 4. Enclosure 4 has an upper end 55 and a lower end 56, upper and lower ends being referenced to FIG. 5. The enclosure 4 delimits a generally cylindrical space or volume 54 between the ends 55 and 56. The plate 53 divides the volume 54 into a first chamber 57 and a second chamber 58. Plate 53 has a hub 59 extending upwardly from it. The hub 59 has an axial opening 60 through it, the opening 60 being defined by an interior wall 61. Wall 61 defines a pair of lips formed on opposite ends of the hub 59. The lips are sized to receive one each of a pair of bearings 64. A wave washer and a flat washer are positioned on shaft 24 to locate and hold the shaft 24 with respect to the bearings 64 in a conventional manner in the assembled relationship of the parts.

Chamber 57 is sized to receive motor control board 9. Motor board 9 is a circuit board, at least one surface of which has a plurality of electrical connections and components associated with it. These components are illustratively indicated by the reference numeral 70. The motor board 9 has a central opening 68 formed in it, permitting the board (and stator assembly) to be mounted over the hub 59 to position the board 9 in the chamber 57. Plate 53 also has an opening 46 formed in it, which permits communication between the chamber 57 and the chamber 58.

The stator assembly, wound and with the appropriate ends 18 of the windings mounted in the termination means 17, is secured to the printed circuit (motor) board 9 by spade terminals that make electrical contact with the ends 18, and, passing through suitable passages in the motor control board 9, are electrically connected, on the opposite side of the board, with electrical conductors to connections 90.

Chamber 58 is sized to receive the motor control assembly 10. The power supply assembly 10 includes a circuit board 75 having a plurality of components associated with it, generally illustratively indicated by the reference numeral 76. Details of the control portions of the motor assembly 1 are contained in the above referenced co-pending application 08/237,782, incorporated herein by reference. It is here noted that a board 75 of the motor control assembly 10 is generally a high voltage (AC) input board, and the motor control board 9 is a low voltage (DC) board from which the stator assembly 7 is operated.

As best shown in FIG. 1, the base 50 is formed to define a connector block 80. Block 80 is sized to receive a plurality of male electrical connectors 81. The connectors 81 are attached to the board 75 in a conventional manner, and define the input power connection for the motor assembly 1.

The electrical connection 90 is in the form of a pair of electrical conductors 91, electrically connected at one end to the circuit of the motor board 9, which extend through the opening 46 in the plate 53 into the space 54, adjacent a connector boss 83. In this embodiment, the connector boss 83 is also of the insulation displacement type, in particular, of the type sold under the trademark MAGMATE, with an elongate leg 84, integral at its upper end with an inner surface of the plate 53, slots 86 to receive the conductors 91, and channels 87, parallel to the slots and perpendicular to a surface of a closed end of each slot defining a passage transversely through the boss.

Figure 4:
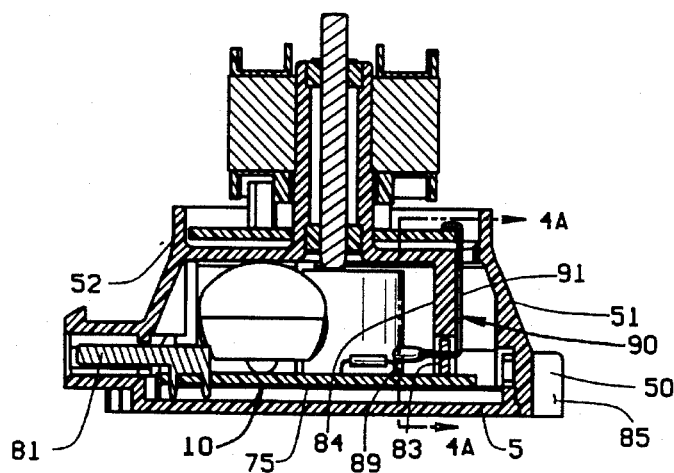
FIG. 4 is a view corresponding to FIG. 3, without the rotor and fan assembly of FIG. 3.
Figure 4A:
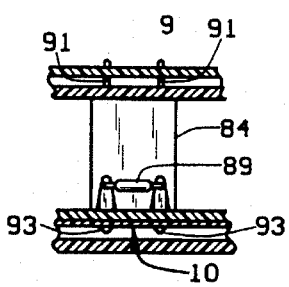
FIG. 4A is a fragmentary view of a connector boss with a connection of this invention.
Figure 5:
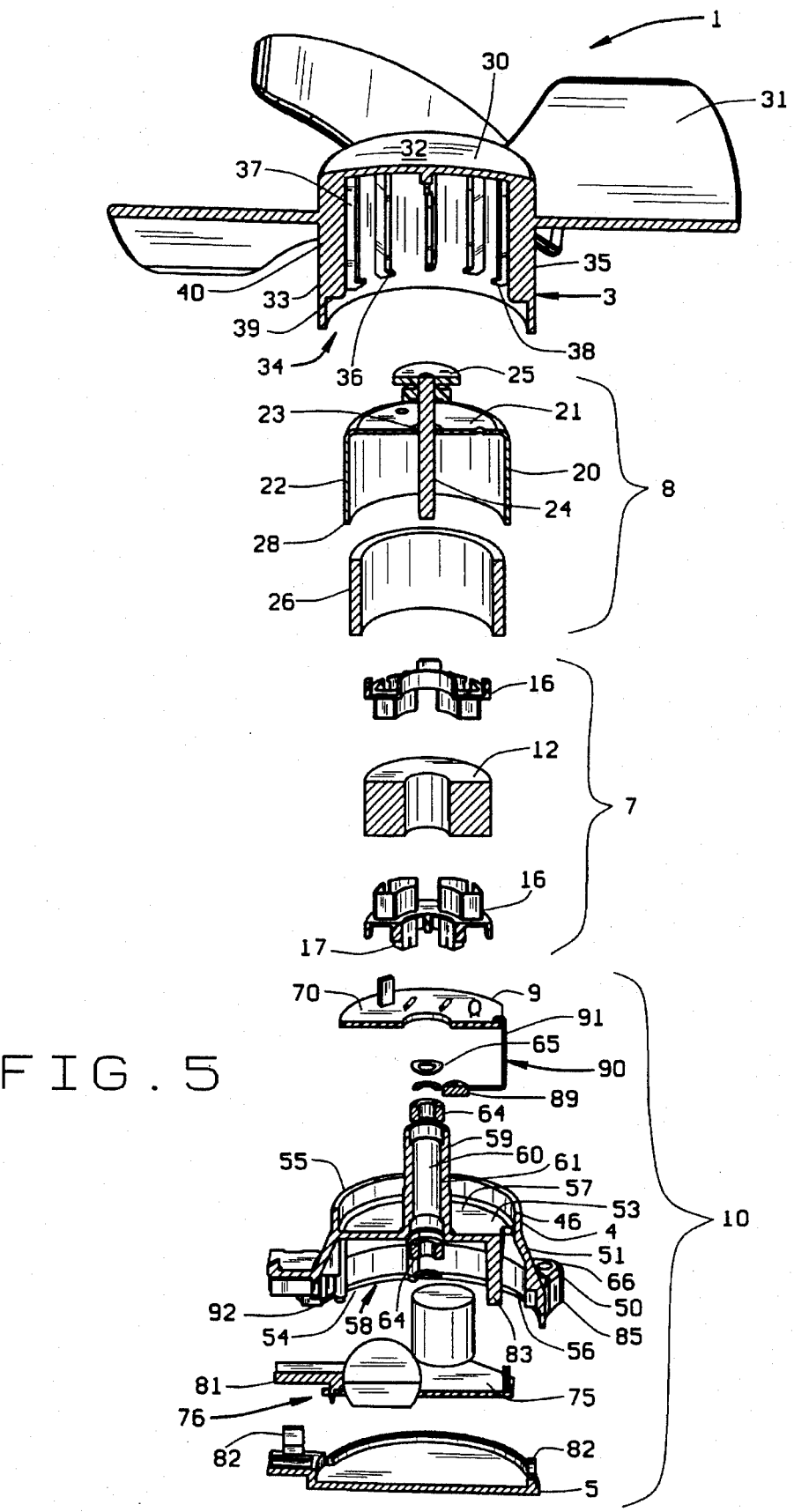
FIG. 5 is an exploded view of the motor shown in FIG. 1.

The conductors 91 are bridged, at or near their outer ends, by a passive element of the electrical circuit, in such a way that the two conductors 91 are spaced the same distance as the slots 86 are spaced, and held substantially parallel through the reach of the passage defined by the slot through the boss. Thus, the conductors 91 can be inserted simultaneously into and through the slots 86, each being aligned with its slot. Preferably the reach of the conductors 91 across the slot is between the passive element 89 and the bends in the conductors where they pass through the slots. In the drawing, FIG. 4A, the circuit element is shown as a small capacitor 89, but other circuit elements can be employed. The element itself need not be the exact size required to hold the conductors 91 apart the right amount, because the leads from the element give ample leeway. Of course, the element cannot be too large. Preferably, the passive element 89 is manufactured with long leads, which form the conductors 91.

Spade connectors 93, electrically connected to conductors from the power supply assembly board 10, fit in the channels 87 to make physical and electrical contact with the conductors 91.

The base 50 also defines a plurality of mounting pads 85 by which the motor assembly 1 is attached to its intended application.

The cover 5 is sized to close the chamber 58. The cover 5 includes a plurality of mounting devices 82 which are intended to be received in suitable receptacles 92 formed in the base 50 in a snap fit relationship. When so positioned, the cover 5 closes the chamber 58.

Figure 3:
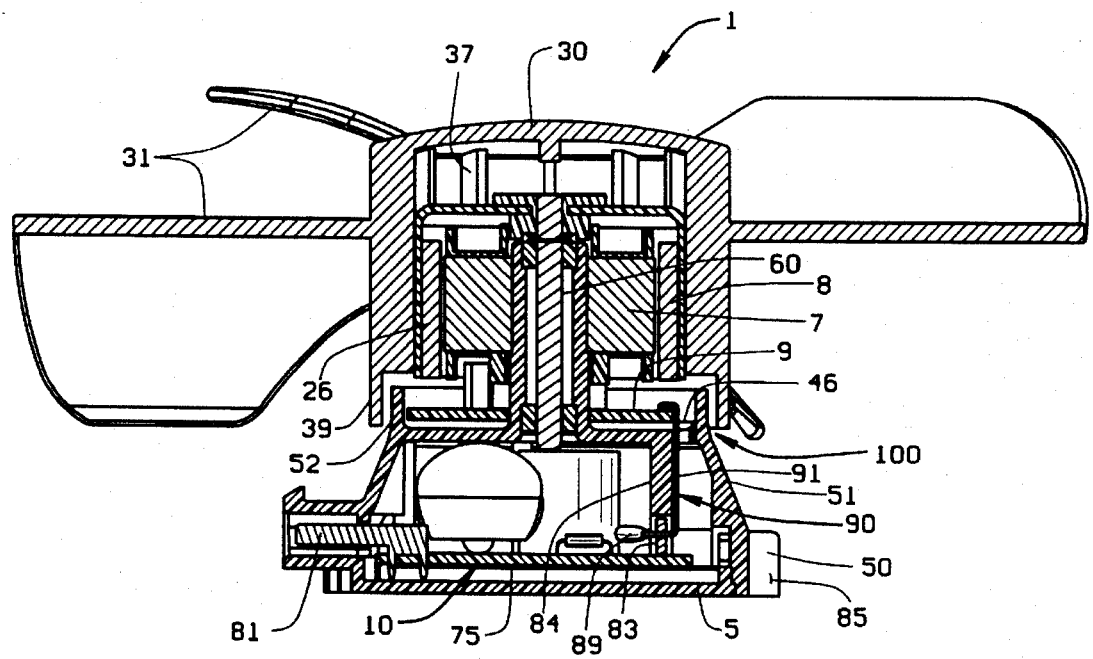
FIG. 3 is a sectional view taken along the 3—3 of FIG. 2.

Part of the subject matter of Ser. No. 08/237,780 has to do with the relationship between the rotor cup and the enclosure. As shown in FIG. 3, in the assembled relationship of the various parts shown exploded in FIG. 5, the lip 39 of the side wall 33 overlaps the portion 52 of the base 50. That overlap defines a movable labyrinth seal system 100 which keeps the chamber 57 and the remaining motor structural components free from any associated environmental contaminants the motor assembly 1 may encounter in applicational use.

As is apparent from the above description, the motor assembly 1 is constructed entirely without the use of threaded fasteners or other similar mechanical types of fasteners. In addition, the construction of the assembly 1 is substantially simplified and may be automated in a number of respects, the provision of the spacing member contributing to that process. As has been explained above, the cup 20 shaft 24 combination is constructed, and the stator assembly 7 insulated and wound. As described in application Ser. No. 08/240,633, and shown in FIG. 7, motor winding turn ends 18 are associated with the winding termination 17 of the insulation system 16 employed with the stator assembly 7. That permits the stator assembly to be plugged into the board 9, thereby making the electrical connection between the windings 15 of the stator assembly 7 and the board 9 merely by that interconnection. The provision of the spacing element 89 between the conductors 91 makes the installation of the conductors 91 into the connector block 83 a simple bending operation. The use of the connector 90 permits the board 75 to be interconnected to the connector 90 merely by the placement of the board 75 into the chamber 58. The attachment of the male electrical connections 81 directly to the board 75 and their extension through block 80 again, is accomplished merely by component placement. The arrangement permits automation of motor assembly manufacture in a way not available with prior art motor construction.

Referring now to FIGS. 10–22 for an illustrative example of a BPM motor in which only one printed circuit board is utilized, reference numeral 101 indicates the complete motor. The motor 101 includes a rotor cup 102, which in this embodiment has a threaded shaft 103 extending outwardly from it, by which fan blades, not here shown, are mounted. The motor 101 also includes a base-enclosure 104 and a cover 105. Mounting bosses 106, of a piece with the base enclosure 104, are shaped and positioned as required by the configuration of a mounting bracket of a refrigerator.

Within the confines of the rotor cup are a stator assembly 107 and a rotor assembly 108, the essential constructions of which are identical with the stator assembly 7 and rotor assembly 8 of the motor described in connection with FIGS. 1 through 9. A printed circuit board or motor board 109 is positioned between the stator assembly 107 and an outside surface 157 of a top wall 155 of the base-enclosure 104. Circuit elements indicated generally by the reference numeral 110, are electrically connected, by way of wire leads extending through appropriate holes in the board, to printed connecting circuits on the under side of the board, as is conventional. In this embodiment, the board 109 is not co-extensive with the outside surface 157, but is formed with an off-set 111 over which PC board conductors 124, which are electrically connected to the printed circuit on the under side of the board 109, extend. A passive element 125, here shown as a resistor, connected electrically and physically to the conductors 124, bridges the conductors 124 and spaces them, in the same way in which the capacitor 89 was described as spacing the conductors 91. As has been explained in connection with the conductors 91, the conductors 124 can simply be long leads from the passive element 125.

The stator assembly includes a stator core 112, and, as shown in detail in FIGS. 19 through 22, an upper molded insulator 113 and a lower molded insulator 114, around a part of which windings 115 extend. The lower molded insulator 114 has, of a piece with it, termination legs 117. Each of the termination legs has a lengthwise slit 119 in it, to accept a winding lead end 118, which lies transversely across the leg 117 in the bottom of the slit. The leg 117 also has a longitudinally extending channel 120, in which a spade terminal 122 is seated. The spade terminal 122 has an inner end that makes physical and electrical contact with the winding lead end 118, and a tapered outer end that projects from the leg 117, and extends through a hole in the motor board 109. The outer end is electrically connected to printed conductors on the lower surface of the motor board 109.

The motor board 109 has a hub-receiving aperture, and when the stator core is mounted on the motor board, as has been explained in connection with the construction of the motor 1, the stator core and motor board are mounted on a hub 159 which is of a piece with the top wall 155 of the base-enclosure 104, in much the same way as the stator assembly 7 is mounted on the hub 59 of the motor 1. The conductors 124, with the passive element 125 between them, extend through an opening 158 in the top wall 155, into the interior of the cup shaped base-enclosure.

The interior space of the base-enclosure 104 is defined by the top wall 155, and a side wall 151, which has an inside surface 152, and, extending through an outer edge, a port 153. The outer edge of the side wall 151 is stepped inwardly to provide a seat 154.

The top wall 155 has an inside surface 156, with which a connector boss 181 is integral. The connector boss 181, like the connector boss 83 of the first embodiment, has slots 182, spaced, like the slots 86, to receive a reach of the conductors 124, between the passive element 125 and an elbow at which the conductors are bent to extend transversely of the boss 181, and channels 183 sized to admit and engage spade terminals 128, which are in physical and electrical contact with the conductors 124. The advantages of the arrangement are the same in both instances.

The terminals 128 are secured in electrical contact with current supply conductors 126. The current supply conductors 126 have insulating sheaths 127, and extend outside the base-enclosure 104 through the port 153 in the side wall 151. At an outer end of the current supply conductors 126, they can be connected electrically to any suitable terminal, such as a male plug, as is desired in the application to which the motor is being put.

The details of the construction and operation of the cover 105 are the subject of co-pending application Ser. No.

240,633/08, Baker and Crapo, Plastic BPM Condenser Motor for Refrigerators, and the contents of that application are incorporated herein by reference.

In assembling motor 101, the circuit element 125 is secured physically and in electrical contact with the conductors 124 in such a way as to space them appropriately, as has been described. The stator assembly is mounted on the printed circuit board as was described in connection with the motor shown in FIGS. 1 through 9, and the entire assembly is installed on the hub 159, with the conductors 124 oriented downwardly toward the base-enclosure, the conductors 124 and circuit element 125 extending into the interior space of the base-enclosure. The conductors 124 are then inserted through the slots 182 and the current supply conductor terminals 128 inserted to complete the electrical connection. The current supply conductors 126 are then led out through the open-bottomed port 153, and the cover 105 snapped into place, and the motor is completed.

Numerous variations, within the scope of the appended claims, will occur to those skilled in the art in light of the foregoing disclosure. Merely by way of example, different circuit elements can be used, such as diodes or other components of circuits used in BPM motors. A dummy element can be used, but its use eliminates one of the advantages of the preferred embodiments. Although the arrangement has particular application to the types of motors described, and their cup-shaped base-enclosures, other types of motors and different types of enclosures for one or both of the circuit boards can be employed. A multiplicity of conductors rather than simply two, to be inserted into spaced slots, can be spaced by circuit elements of the circuit or circuits to which they are electrically connected. These variations are merely illustrative.

Having thus described the invention, what is claimed and desired to be secured by Letters Patent is:

1. A dynamoelectric machine comprising:

a stator assembly;

a rotor assembly associated with said stator assembly and rotatable therewith;

an enclosure defining an interior space, said rotor and stator assembly being mounted in said interior space;

a printed circuit board mounted in said interior space;

a pair of electrical conductors electrically connected to said printed circuit board;

a conductor boss, said conductor boss having an elongated leg with spaced slots generally through an outer end of said leg and having closed ends defining passages transverse of said leg, and channels parallel to said slots and perpendicular to said passages;

a plurality of circuit elements, at least one of said circuit elements physically and electrically connected between said conductors to bridge said conductors and space said conductors by the spacing of said slots in said connector boss, said conductors being mounted in and extending transversely through said slots and being electrically connectable to a source of electrical power.

2. The improvement of claim 1 wherein said printed circuit board is mounted on an exterior surface of an enclosure having a side wall and a top wall, inside surfaces of which define an interior space, and said connector boss is of a piece with at least one of said inside surfaces.

3. The improvement of claim 2 including a motor control circuit including a second printed circuit board mounted within said interior space, a source of power electrically connected to said motor control circuit and said terminals of said source of power to said first printed circuit being electrically connected to said control circuit.

4. A brushless permanent magnet motor with a stator mounted on a hub projecting from an enclosure, said enclosure comprising an open-bottomed cup-shaped base-enclosure, said base-enclosure having a side wall and a top wall defining an interior space; a printed circuit board mounted above said top wall and below said stator; a pair of electrical conductors electrically connected to a printed circuit on said printed circuit board, said electrical conductors extending from said printed circuit board through an aperture in said top wall and into said interior space; a connecter boss integral with at least one of said top and side walls, said connector boss having an elongated leg with spaced slots opening through an outer end of said leg and having closed ends defining passages transverse of said leg, and channels extending parallel to said slots and perpendicular to said passages; an element of said circuit connected physically and electrically between said conductors to bridge said conductors and space said conductors by the spacing of said slots in said connector boss, said conductors being mounted intermediate their lengths in and extending transversely through said slots in physical and electrical contact with terminals of a source of power to said printed circuit mounted in said channels.

5. The improvement of claim 4 wherein said circuit element is connected to ends of said conductors remote from their connection to said circuit with respect to said connector boss.

6. In a motor circuit including a printed circuit board and a plurality of elongated conductors electrically connected to said circuit at said printed circuit board, said conductors being mounted intermediate their lengths in and extending transversely through spaced elongated slots in a connector boss in physical and electrical contact with terminals of a source of power to said printed circuit board, the improvement comprising an element of said motor circuit physically and electrically connected between successive ones of said conductors, bridging said conductors and spacing said conductors by the spacing of said slots in said conductor boss, said element being connected to ends of said conductors remote from their connection to said circuit with respect to said connector boss, said connector boss having channels perpendicular to the direction of said conductor in its reach through said conductor boss, said power source terminals being mounted in said channels.

7. The improvement of claim 6 wherein said printed circuit board is mounted on an exterior surface of an enclosure having a side wall and a top wall, inside surfaces of which define an interior space and said connector boss is integral with at least one of said inside surfaces.

8. The improvement of claim 7 including a motor control circuit including a second printed circuit board mounted within said interior space, a source of power electrically connected to said motor control circuit and said terminals of said source of power to said first printed circuit being electrically connected to said control circuit.

* * * * *